UNITED STATES PATENT OFFICE

WILLIAM J. HALE, OF MIDLAND, MICHIGAN

PREPARATION OF ORGANIC ACID ANHYDRIDES

No Drawing.    Application filed October 20, 1928.   Serial No. 313,951.

This invention relates to preparation of organic acid anhydrides by the initial preparation of a mixed anhydride, one arm of which comprises the desired acid radicle, and the treatment of such mixed anhydride in such manner as will yield the anhydride sought together with an organic compound containing the radicle of the other arm; and particularly proposes a method by which the radicle of the other arm of the mixed anhydride may be passed through a cycle in which the mixed anhydride is again generated for further treatment, and in which other products formed and all escaping components can be recovered in the cycle for further exploitation to produce the desired acid anhydride.

The preparation of organic acid anhydrides by interaction between an acyl halide and the metallic salt of the corresponding acid has long been known. The use in this connection of the free acid in place of its salt has claimed the attention of many investigators; the acid anhydride here capable of formation is found very reactive with the hydrogen halide simultaneously produced as set forth in the equilibrium below wherein R and X represent, respectively, the organic radicle and halogen concerned and R' is the same or another organic radicle:—

(1)  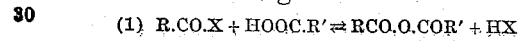

In accordance with German Patent 396,696 (1923) as much as a 50% yield of acetic anhydride may be obtained directly by the action of acetyl chloride upon glacial acetic acid in spite of the difficulty of separation from the escaping hydrogen chloride vapors and the accompanying highly volatile acetyl chloride. It is immediately apparent that the trapping of the highly volatile acyl halide by chemical means will be preferable to any physical means if the product so produced becomes in turn serviceable in the process.

Thus, by the action of a halogen upon an acyl halide, we arrive at halogenated acyl halides; chlorine upon acetyl chloride leads to chloroacetyl chlorides, the mono-chloroacetyl chloride having a boiling point of 105° C., and thus being easily condensible. Monochloroacetyl chloride is readily prepared by the action of chlorine upon monochloroacetic acid (B. P. 189° C.) in the presence of sulphur chloride when the reaction is conducted at approximately 60° C.;

(2)  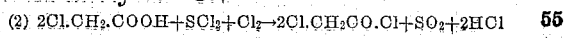

When, also, for example, the vapors of hydrogen chloride and acetyl chloride (B. P. 55° C.) are led into the chlorinating chamber, there will be complete conversion of acetyl chloride into monochloroacetyl chloride:

(3)  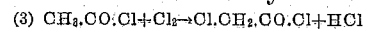

If now the monochloro-acetyl chloride is caused to interact with glacial acetic acid (B. P. 119° C.), the course of reaction is much the same as that between acetyl chloride and this same acid: comparatively speaking, there is a larger yield (80%; B. P. 170° C.) of the mixed (monochloracetic-acetic) anhydride than was obtainable by treating the acetyl chloride to produce the simple acetic anhydride. This is due to lesser volatility of mixed anhydride as such and greater removal therefore of reactive high boiling fractions from vapor phase above the reactant mass: the equation is here given:

(4)  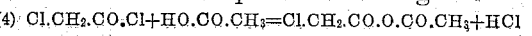

According to the present invention, this reaction occurs while the liquid is permitted to stand quietly for a suitable period of time, while heated to a point below that of active ebullition which is not over 50° C. approximately: no stirring or agitating is employed, and the hydrogen chloride is withdrawn in proportion as it forms. The reaction then proceeds to an end point, by reason of the elimination of the hydrogen chloride. During this reaction the hydrogen chloride present will react to some extent upon the mixed anhydride forming, but this reaction is limited by the absence of boiling and agitation. The end products, however, of this latter reaction will not be the chloroacetyl chloride and acetic acid that went to form the said reactants, but will be chloroacetic acid and acetyl chloride as explained by Brueckner (Zeit. Angewandte Chemie 41, A-226 (1928)).

(5)  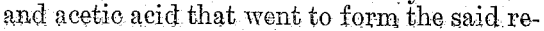

The escaping hydrogen chloride vapors (Reaction 1) will carry some of the acetyl chloride (part of which may be condensed therefrom in pure state for industrial uses as described and claimed in my copending application Ser. No. 313,950, filed Oct. 20, 1928), and such vapors may be led back into the chlorination chamber and all acetyl chloride present conserved by further chlorination to chloroacetyl chloride and as such again brought in cycle into the reaction chamber with glacial acetic acid.

In an analogous example (H. B. Watson, J. Chem. Soc. 1928, p. 1137), molar quantities of bromoacetyl bromide and acetic acid were found to be practically complete in their reaction at 25° C. in one hour, and the products upon distillation are acetyl bromide and bromoacetic acid.

The bromo derivatives are exceedingly active, but more distinct indeed is the far greater activity of hydrogen bromide over hydrogen chloride in its action upon acid anhydrides.

Though the equation for the reaction between chloroacetyl chloride and acetic acid may be written directly as leading to chloroacetic acid and acetyl chloride, such products arise only through the intermediate formation of the mixed anhydride and interaction of hydrogen chloride therewith.

(6) $Cl.CH_2.CO.Cl + HO.OC.CH_3 \rightarrow Cl.CH_2.CO.O.CO.CH_3 + HCl$
$\rightleftharpoons Cl.CH_2.CO.OH + CH_3.CO.Cl$ The reaction (Equation 3) between chloroacetyl chloride and glacial acetic acid may be made directly as much as an 80 to 85% yield of isolatable mixed anhydride, where the monochloracetic-acetic anhydride; but to obtain such a high yield of isolatable anhydride the greatest care must be exercised to remove the hydrogen chloride as it forms in order to prevent the intermingling of the mixed hydrogen chloride with the reaction components. Owing, however, to the recovery in cycle of any products produced from such intermingling, according to the present invention as respects the production of the simple anhydride, less care need be employed.

Though the evidence accepted by Autenrieth and Thomas (Ber. 57,423 (1924)) indicates that many mixed organic anhydrides are to be looked upon as mixtures of the simple respective anhydrides, there remains indisputable evidence of the chemical individuality of formic-acetic anhydride, monochloracetic-acetic anhydride and many others involving the lower membered carbon radicles and certain of their derivatives. All doubt on the existence of mixed anhydrides is now dispelled by van der Haar (Rec. trav. chim, 1929, 48, page 607; see Chem. Abs. 1929, 4478), in which mixed anhydrides are formed by the action of acetic anhydride upon the acids. The only exception appearing to arise when these free acids contain aldehydic or ketonic groups. Furthermore, the Consortium Fuer Elektrochemie has just patented a process for the preparation of mixed anhydrides through the agency of vinyl acetate (Br. Patent 288,549, see Chem. Abs. 1929, p. 608; Fr. Patent 562,078, see Chem. Abs. 1929, page 3479).

However, in the practice of this invention, the possibility of the momentary existence of any mixed anhydride makes such immediately applicable with the halohydrogenation stage hereinafter defined.

It is now further proposed to utilize this mixed, anhydride, for example, the monochloracetic-acetic anhydride above described (B.P.168–170°), one member of which is an acetyl radicle and the other a monochloroacetyl radicle, in the preparation of a simple anhydride such as acetic anhydride (B.P. 136° C.), and for this purpose, it is only necessary to decompose or break down the monochloracetic-acetic anhydride. In the course of the operation here described, and as set forth in the following examples, it is probable that this decomposition is occurring in two ways: (a) The mixed anhydride is breaking down into a mixture of the simple anhydrides (simple acetic anhydride and monochloracetic anhydride), the latter of which then reacts in the presence of the glacial acetic acid to form chloroacetic acid and simple acetic anhydride; (b) likewise a decompostion of the mixed anhydride is occurring by simple replacement of the chloroacetyl radicle by an acetyl radicle from the glacial acetic acid. In either event, the final result is the production of acetic anhydride which is being driven off and can be condensed, and chloroacetic acid which can be returned through the cycle (Example I). In Example II, the reaction is accomplished in the presence of chloroacetic acid, so that the simple (monochloracetic) anhydride is obtained, while acetic acid is driven off. In case (a) above reactions 7 and 8 are occurring: and in case (b) above, Equation 9 is occurring, with Example I.

(7) $2Cl.CH_2.CO.O.CO.CH_3 \rightarrow (Cl.CH_2.CO)_2O + (CH_3.CO)_2O$ (8) $(Cl.CH_2.CO)_2O + 2CH_3.COOH \rightleftharpoons (CH_3.CO)_2O + 2Cl.CH_2.COOH$ (9) $Cl.CH_2.CO.O.CO.CH_3 + CH_3.COOH \rightleftharpoons Cl.CH_2.COOH + (CH_3.CO)_2O$ The greater volatility of acetic anhydride over the mixed (monochloracetic-acetic) anhydride affords a comparatively simple control of the direction of the reaction to the end sought. Naturally the acetic acid must be admitted carefully so as to avoid much of this acid being carried over with the acetic anhydride before it has had a chance to react with the mixed anhydride.

The metathesis here concerned in substitution of one member of an organic compound of "water" type with another member of similar structure is well known, e. g., ethyl acetate heated with propionic acid yields ethyl propionate and acetic acid. So also chloroacetic acid itself boiled with acetic anhydride yields monochloroacetic anhydride (of high boiling point) according to U. S. Patent 1,648,540, but in such case it must be understood that one molecule of chloroacetic acid reacts initially to produce the mixed (monochloracetic-acetic) anhydride which in turn reacts with a second molecule of chloroacetic acid to give the simple anhydride of monochloroacetic acid. The course of this reaction, however, is controlled by the continual presence of the acetic acid (Example I below).

(10) 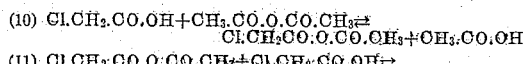

(11) 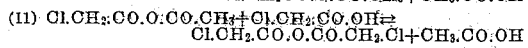

Naturally this type of substitution requires that one of the products shall be easily removable from the other at the temperature of reaction to insure its completion. The introduction, therefore, according to the present invention of glacial acetic acid into the mixed (monochloracetic-acetic) anhydride, when held at a temperature slightly above 136° C., makes immediately possible the removal by distillation of the acetic anhydride of immediate formation whereas the chloroacetic acid radicle displaced from the mixed anhydride is now left in association with the hydroxyl radicle of the former acetic acid and thus remains in the reaction vessel as chloroacetic acid of higher boiling point.

The chloroacetic acid thus remaining as residue in the reaction vessel is now transferred to the chlorination chamber and again transformed into chloroacetyl chloride. This chloroacetyl chloride is then again brought into reaction with an equivalent quantity of acetic acid whereby to form the mixed (monochloracetic-acetic) anhydride, and again to meet with a second equivalent quantity of acetic acid whereby to liberate acetic anhydride and be itself reconverted into chloroacetic acid, only again to be returned to the chlorination chamber for conversion to chloroacetyl chloride, and so on through the cycle. All acetyl chloride, however, that issues with the escaping hydrogen chloride vapor during the process of formation of the mixed anhydride is likewise led into the chlorination vessel for recovery and is returned to the process as chloroacetyl chloride. This particular circulating fraction of acetyl chloride so involved remains constant throughout the reaction as conducted under any definite conditions, and hence is easily considered in calculations effecting proportional amounts of acids and halides concerned.

The particular advantage of this type of synthesis wherein a mixed acid anhydride suffers replacement of one of its members by an acid radicle attached to hydroxyl rests in the use of only so high a temperature as that required for removal by distillation of one of the primary components of the system in equilibrium (here the removal of the acetic anhydride itself), and thus the dehydration of an organic acid is made possible of accomplishment within the range of boiling point of corresponding acid.

Naumann (Ann. 129,273, 1864), has indicated the possible decomposition of monochloracetic-acetic anhydride into acetic anhydride and monochloroacetic acid at temperatures somewhat above the boiling point of this mixed anhydride, and experiment has proved that this mixed anhydride by preheating in vacuo actually breaks down to a larger extent into acetic anhydride and monochloroacetic anhydride, but not altogether without losses by products from further decomposition. Hence a process for the preparation of acetic anhydride based upon this type of decomposition is not preferable over that described above. Even with such a method, however, the present invention will permit of the return for halogenation of the symmetrical haloacetic anhydride, just after the pure acetic anhydride has been driven off and prior to undesirable decomposition reactions, whereby to be converted to haloacyl halides and thus be made available for the production of more mixed anhydride.

The action of chloroacetic acid upon the mixed (monochloracetic-acetic) anhydride represents the other arm or member substitution, and one that will yield a simple anhydride, notably monochloroacetic anhydride, i. e., the anhydride of monochloroacetic acid, according to Equation 11 above.

Naturally the temperature for this reaction need only exceed by a few degrees that of the boiling point of acetic acid (118° C.) for the removal of the lower boiling component of the system in equilibrium, when all that remains in reaction vessel will be monochloroacetic anhydride.

The possibility of chlorination of acetyl chloride or chloroacetic acid to higher chlorinated products such that the chloroacetyl chloride may contain traces of dichloroacetyl chloride or even trichloroacetyl chloride is always a factor for consideration; careful fractionation will always be required during this step when the symmetrical dichloroacetic anhydride is to be the end product of the process. When, however, the purpose in view is the manufacture of acetic anhydride, it can matter in no way whether the chlorinated acyl chlorides are of the mono-, di- or tri- substituted type as these products turn and return continuously throughout the operating steps. Thus, the reaction between dichloroacetyl chloride and glacial acetic acid proceeds equally as well as when the monochloroacetyl chloride is employed. Likewise, the mixed anhydride, dichloroacetic anhydride, in its interaction with acetic acid, yields acetic anhydride and the equivalent quantity of dichloroacetic acid which returns to the chlorination vessel and again enters the reaction as dichloroacetyl chloride.

Impurities in the acetic acid, such as butyric acid and higher membered organic acids, need not be considered as entering into the reaction, since any compounds formed therefrom may easily be separated by fractionation if so desired.

The work of Orton, Watson and Hughes (J. Chem. Soc. 130, 2458 (1927)) has clearly shown the catalytic effect of acyl bromides and hydrogen halides in speeding up the halogenation of acid anhydrides. Possibly the enolized form of acid anhydride comes into consideration to some extent. The present invention, however, conducts the second step in the reaction, namely that of displacement of one member in a mixed anhydride by another acyl group, entirely in the absence of hydrogen halides and acyl halides, so that the great number of possibilities for varies reaction products noted by these authors is herein eliminated.

*Example I*

A reaction flask provided with reflux is charged with 60 grams of glacial acetic acid and 113 grams of chloroacetyl chloride and allowed to stand for an hour or more. The reaction is brought to an end by gentle warming; the presence of a catalyst, such as cuprous chloride, alone will be found particularly effective. The hydrogen chloride evolved from surface of reaction mixture is allowed to escape without disturbance to the main mass of the mixture comprising monochloracetic-acetic anhydride. (This hydrogen chloride vapor carries with it an appreciable quantity of acetyl chloride and thus these vapors are led directly into a chlorination chamber, to be treated with chlorine along with the chloroacetic acid residue left in reaction flask after the second step in the process.) When the first step is completed and all of the hydrogen chloride has been driven out as by vacuum or gentle warming, an equimolecular quantity of glacial acetic acid, based upon the mixed chloracetic-acetic anhydride formed, is now introduced and the contents of the flask brought to a temperature of approximately 150° C., i. e., sufficient to permit the removal by distillation of the acetic anhydride here formed. The weight of acetic anhydride obtained is 87.1 grams, calculated to a yield of 85.4% on the acetic acid employed. The residual chloroacetic acid from the reaction flask when augmented by the increment of acetyl chloride escaping during the first step in the process, will, in turn, by chlorination give a larger proportion of chloroacetyl chloride for the first step and thus the overall amount of acetic anhydride obtained at once rises to almost quantitative yield.

*Example II*

In similar fashion to Example I, the mixed chloracetic-acetic anhydride is prepared from 60 grams of glacial acetic acid and 113 grams of chloroacetyl chloride at low temperature. There is then introduced into the flask an equimolecular quantity of chloroacetic acid, 67.6 grams, based upon the mixed chloracetic-acetic anhydride formed (approximate 80%), and the contents of the flask warmed but not to exceed 125° C. (only slightly above the boiling point of the acetic acid), which acid hereby liberated is thus entirely removed, condensed and held in readiness for the succeeding operations. The anhydride of chloroacetic acid remaining as residue in the flask is now distilled in vacuo and 104 grams is obtained, calculated to be about 86.6% yield. The residual material, however, together with the acetyl chloride escaping in the first step is now brought back into the form of chloroacetyl chloride in the chlorination chamber, and again mixed with the glacial acetic acid distilled out as above, when the cycle is thus established. When the operation is so conducted, the overall yield amounts to practically quantitative proportions.

In the above examples has been set forth a procedure by which a mixed anhydride is (a) on the one hand decomposed to some extent into a mixture of the simple anhydrides, with removal and separation of the simple anhydride sought and with treatment of the other simple anhydride with the acid whose anhydride is sought to produce the acid containing the other radicle from the mixed anhydride and a further quantity of the anhydride sought; the anhydride sought being of differing boiling point from that of the other acid so that separation by distillation is possible: the other acid is then employed to prepare a further quantity of initial mixed anhydride by the steps of halogenating and treating with the acid whose anhydride is sought. A further reaction is occurring at the same time (b) in which the mixed anhydride is undergoing direct reaction in the same vessel with the acid whose anhydride is sought whereby is directly prepared the other acid and the simple anhydride sought: the other acid thus prepared being mingled with the same acid coming from procedure (a); and passing likewise through the steps of halogenation and treating with the acid whose anhydride is sought.

It is, however, possible to carry out the invention in other manners. For example, other compounds of "water" type may be employed as the anhydride in question. For example, acetic-benzoic anhydride may be decomposed, on heating, into a mixture of benzoic anhydride and acetic anhydride, just as in procedure (a) above. The benzoic anhydride upon treatment with an acid such as halogen halide will produce equimolecular quantities of benzoyl halide and benzoic acid. The benzoyl halide may then be caused to react with acetic acid to prepare again the initial mixed anhydride. The benzoic acid accumulating may be separated and treated by a halogenating step to bring it into the form of benzoyl halide, which likewise may be treated with acetic acid to produce the initial mixed (acetic-benzoic) anhydride.

Further, inasmuch as the preparation of the mixed anhydride is attainable by the reaction of the acid chloride containing the radicle of one of the arms upon the acid containing the radicle of the other arm, it is also possible to condense the chloroacetic or benzoic acid employed in the above illustration with acetyl chloride, for example, whereby a removal of hydrogen halide can be effected with the production of the initial mixed anhydride.

A particular advantage of this latter reaction in some instances is that it is necessary to treat only one-half of the residuum with free halogen: thus reducing the cost of the operation. The acetyl chloride illustratively employed may, for example, be obtained by a cyclic halogenating operation as set forth in my copending application Ser. No. 313,950, filed Oct. 20, 1928, for reaction with the benzoic acid: while the benzoyl chloride will react directly with acetic acid.

Also, it will be noted that the desired simple anhydride is formed and removed from the system while the radicle constituting the other arm of the mixed anhydride leads to an oxy compound which differs in boiling point from the simple anhydride sought, so that a ready separation may be effected and the said oxy compound may be returned in a cycle for preparation of further initial mixed anhydride. In Example I above, by way of illustration, the circulating chloroacetyl radicle produces chloroacetic acid which is of higher boiling point than the simple acetic anhydride: while in Example II, the circulating acetyl radicle produces acetic acid which is of relatively lower boiling point than the chloroacetic anhydride sought.

The mixed anhydride also may be formed other than from the organic acids, since any organic anhydride, i. e., organic compound of "water" type, such as an ester in which the radicle of one arm is the radicle of the anhydride sought, may be employed to the same end. Thus, with benzyl alcohol may be produced the mixed (benzyl-acetic) anhydride, i. e., benzyl acetate, which upon super-heating may be resolved into a mixture of the simple anhydrides (acetic anhydride and benzyl ether). The benzyl ether upon treatment with hydrogen chloride leads to benzyl chloride, which in turn by reaction with acetic acid will produce further mixed anhydride (here benzyl acetate), and the cycle continues. It will particularly be noted that in this instance no employment of free chlorine is required.

What has been outlined illustratively for the preparation of acetic anhydride through chlorination of the circulating mixed acetyl chloride and chloroacetic acid is equally applicable for the preparation of this and other anhydrides through halogenation of mixed circulating compounds. In carrying out this latter operation we need only, for example, to react bromoacetic acid with bromine to obtain monobromoacetyl bromide and then to cause this to react upon a mole of acetic acid while withdrawing hydrogen bromide as it is liberated, to obtain monobromacetic-acetic anhydride. This latter is next brought into reaction with further acetic acid, and the acetic anhydride is evaporated out and condensed while the remaining bromoacetic acid is returned to the bromination chamber for conversion to bromoacetyl bromide and the cycle continued as before. Any acetyl bromide escaping with the hydrogen bromide is likewise returned to the bromination chamber.

In general, the practice of this invention proposes the establishment of a cycle by which the simple anhydride sought may be drawn off from association with an organic compound containing a foreign radicle, and this foreign radicle is caused to react with a compound containing the radicle of the acid anhydride sought: the presence of this foreign radicle in the system leading to the smooth operation throughout the same, and the return for recovery of all the organic products other than the simple anhydride sought.

What I claim as new and desire to secure by Letters Patent is:

1. The cyclic method of preparing a simple anhydride of a lower saturated aliphatic acid which comprises mixing the latter with an easily dissociable and hydrolyzable organic halide, warming to drive off the hydrogen halide, heating the mixed anhydride substantially to the boiling point of the simple acid anhydride sought, whereby to convert the said mixed anhydride into the acid anhydride sought and the simple anhydride containing the radical of said organic halide combined with oxygen and to vaporize said acid anhydride sought while leaving as residue the anhydride of said other organic radical, and halohydrogenating the said other anhydride whereby to replace its anhydride oxygen by halogen, whereby to form again said initial organic halide.

2. The cyclic method of preparing a simple anhydride of a lower saturated aliphatic acid which comprises mixing the latter with an easily dissociable and hydrolyzable organic halide, warming to drive off the hydrogen halide, heating the mixed anhydride substantially to the boiling point of the simple acid anhydride sought whereby to form through metathesis with itself the acid anhydride sought and the anhydride of the other organic radical, and to vaporize said acid anhydride sought and leave as residue the anhydride containing the radical of said organic halide, and halohydrogenating said residual anhydride for the preparation of a further quantity of the said organic halide.

3. The cyclic method of preparing a simple anhydride of a lower saturated aliphatic acid which comprises mixing the latter with an easily dissociable and hydrolyzable organic halide, heating the resulting mixture to drive off the hydrogen halide and then to resolve the mixed anhydride into the simple acid anhydride sought and said oxygen compound, fractionally distilling said simple anhydride from the residue containing said oxygen compound, and subjecting the residue to the action of halogenating agents, whereby to produce a further quantity of said initial organic halide.

4. The method of preparing the di-acyl oxide or simple anhydride of a lower saturated aliphatic acid which comprises mixing the latter with the acyl halide of an easily dissociable and hydrolyzable organic acid of boiling point higher than the boiling point of the acid whose anhydride is sought, warming to drive off the hydrogen halide, heating the mixed anhydride to form the simple acid anhydrides of both said acids, fractionally distilling to remove the simple anhydride sought, treating said other acid anhydride in the residue with an acid whereby to produce the said other organic acid, and halohydrogenating said other organic acid to produce the initial acyl halide.

5. The cyclic method of preparing a simple anhydride of a lower saturated aliphatic acid which comprises mixing an easily dissociable and hydrolyzable halo-acyl halide, warming to drive off the hydrogen halide, mixing with the mixed anhydride an approximately equimolecular quantity of the acid whose anhydride is sought, heating the mixture substantially to the boiling point of the simple acid anhydride sought whereby to convert the mixture by metathesis into the acid anhydride sought and a halo acid, vaporizing said acid anhydride to remove it from the residue containing said halo acid, and substituting halogen for the hydroxyl group in the carboxyl group of said halo acid whereby to form again the halo acyl halide.

6. The cyclic method of preparing a simple anhydride of a lower saturated aliphatic acid which comprises mixing the said acid with an easily dissociable and hydrolyzable organic halide combined with an organic radicle and which upon hydrolysis yields a hydrolyzed compound of higher boiling point than the acid anhydride sought, warming to drive off hydrogen halide, bringing into contact with the said mixed anhydride substantially an equimolecular quantity of said aliphatic acid, and heating substantially to the boiling point of the simple acid anhydride sought whereby to form through metathesis of the aliphatic acid with the mixed anhydride both the simple acid anhydride sought and the said hydrilyzed compound, fractionally distilling away the acid anhydride sought and subjecting the residue to the action of halogen so as to produce a further quantity of the initial organic halide.

7. The cyclic method as in claim 6, including the step of mixing the said acid with the organic halide in the presence of a condensation catalyst having the property of cuprous chloride to facilitate the removal of the hydrogen halide.

8. The cyclic method of preparing acetic anhydride which comprises mixing acetic acid with chloroacetyl chloride, warming to drive off hydrogen chloride, heating the residue substantially to the boiling point of acetic anhydride while fractionally condensing acetic anhydride from the escaping vapors, and halo-hydrogenating and halogenating the residue to produce a further quantity of chloroacetyl chloride.

9. The cyclic method of preparing acetic anhydride which comprises mixing acetic acid with chloroacetyl chloride, warming to drive off hydrogen chloride and to produce a residue consisting primarily of acetic-chloroacetic anhydride, adding acetic acid in approximately equimolecular quantity to the acetic-chloroacetic anhydride, heating substantially to the boiling point of acetic anhydride while fractionally condensing acetic anyhydride from the escaping vapors, and subjecting the residue to the action of halogen so as to produce a further quantity of chloroacetyl chloride.

10. The cyclic method of preparing acetic anhydride which comprises mixing acetic acid with chloroacetyl chloride in the presence of cuprous chloride, warming to drive off hydrogen chloride, heating the residue substantially to the boiling point of acetic anhydride while fractionally condensing acetic anhydride from the escaping vapors, and halo-hydrogenating and halogenating the residue to produce a further quantity of chloroacetyl chloride.

11. The cyclic method of preparing acetic anhydride which comprises mixing acetic acid with chloracetyl chloride in the presence of cuprous chloride, warming to drive off hydrogen chloride and to produce a residue consisting promarily of acetic-chloraacetic anhydride, adding acetic acid in approximately equimolecular quantity to the acetic-chloroacetic anhydride, heating substantially to the boiling point of acetic anhydride while fractionally condensing acetic anhydride from the escaping vapors, and subjecting the residue to the action of halogen so as to produce a further quantity of chloroacetyl chloride.

In testimony whereof, I affix my signature.

WILLIAM J. HALE.